United States Patent
Dos Santos et al.

(10) Patent No.: US 10,684,160 B2
(45) Date of Patent: Jun. 16, 2020

(54) METHOD AND EQUIPMENT FOR MEASURING MASS INERTIA OF MOVING SURFACES

(71) Applicant: EMBRAER S.A., São José dos Campos-SP (BR)

(72) Inventors: José Carlos Dos Santos, São José dos Campos (BR); Anderson Tobias Lindegger, São José dos Campos (BR); Claudio Nagafchi, São José dos Campos (BR); Douglas Alves Moraes, São José dos Campos (BR); Oswaldo Escobar, São José dos Campos (BR); Marcelo Camilo Alves Costa, São José dos Campos (BR); Altair Tomaz Mendes, São José dos Campos (BR)

(73) Assignee: EMBRAER S.A., São José dos Campos-SP (BR)

( * ) Notice: Subject to any disclaimer, the term of this patent is extended or adjusted under 35 U.S.C. 154(b) by 159 days.

(21) Appl. No.: 15/919,153

(22) Filed: Mar. 12, 2018

(65) Prior Publication Data
US 2018/0202856 A1     Jul. 19, 2018

Related U.S. Application Data

(62) Division of application No. 14/235,379, filed as application No. PCT/BR2012/000264 on Jul. 27, 2012, now abandoned.

(30) Foreign Application Priority Data

Jul. 27, 2011    (BR) .................................... 1103326

(51) Int. Cl.
*G01G 19/00*     (2006.01)
*G01M 1/10*     (2006.01)

(52) U.S. Cl.
CPC .............. *G01G 19/00* (2013.01); *G01M 1/10* (2013.01)

(58) Field of Classification Search
None
See application file for complete search history.

(56) References Cited

U.S. PATENT DOCUMENTS

| 4,161,876 | A | | 7/1979 | Carpenter |
| 4,212,193 | A | * | 7/1980 | Turley ..................... G01M 1/10 |
| | | | | 473/291 |

(Continued)

FOREIGN PATENT DOCUMENTS

| RU | 2078321 C1 | | 4/1997 |
| RU | 2334198 C1 | * | 9/2008 |

(Continued)

OTHER PUBLICATIONS

RU 2334198 C1, translation (Year: 2008).*

(Continued)

*Primary Examiner* — Lina M Cordero
(74) *Attorney, Agent, or Firm* — Nixon & Vanderhye P.C.

(57) ABSTRACT

Devices are provided to measure the mass inertia of moving surfaces (e.g., aircraft components). In certain embodiments, the devices will include a support frame formed by first and second structural frame members which form a space for positioning of a moving surface to be measured for mass inertia. A pivot joint assembly is supported by an upper portion of the first structural frame member while a distance alignment device is arranged at a lower portion of the support frame. The second structural frame member including an extension and a dynamometer supported operatively by the extension. The first structural frame member includes a comparator clock at a lower portion thereof. The support device is therefore operatively connected to the pivot joint assembly so as to be pivotally movable about a pivot axis (Continued)

relative to the support frame between first and second positions such that the support device is in operative cooperation with the distance alignment device when in the first position thereof and the dynamometer when in the second position thereof.

12 Claims, 6 Drawing Sheets

(56) References Cited

U.S. PATENT DOCUMENTS

| | | | | |
|---|---|---|---|---|
| 4,327,578 | A * | 5/1982 | D'Angelo | G01M 17/0072 73/116.06 |
| 4,559,600 | A * | 12/1985 | Rao | G05B 19/4163 340/680 |
| 5,136,513 | A * | 8/1992 | Sol | B60G 17/0164 701/124 |
| 5,177,998 | A * | 1/1993 | Monk | G01M 1/10 73/65.07 |
| 6,098,025 | A * | 8/2000 | Bae | G01M 1/122 702/94 |
| 6,128,951 | A | 10/2000 | Nance | |
| 6,176,682 | B1 * | 1/2001 | Mills | E21B 47/0006 417/12 |
| 2001/0021347 | A1 * | 9/2001 | Mills | E21B 47/0006 417/18 |
| 2006/0010965 | A1 * | 1/2006 | Mastinu | G01M 1/10 73/65.07 |

FOREIGN PATENT DOCUMENTS

| | | |
|---|---|---|
| RU | 2337198 C1 | 9/2008 |
| RU | 2434213 C1 * | 11/2011 |

OTHER PUBLICATIONS

RU2434213C1 translation (Year: 2011).*
International Search Report for PCT/BR2012/000264, dated Nov. 6, 2012.
Written Opinion of the International Searching Authority for PCT/BR2012/000264, dated Nov. 6, 2012.
Gayman, W.H., "Experimental Determination of the Principal Moments of Inertia of the Helios Prototype Spacecraft", Jet Propulsion Laboratory, (Nov. 15, 1974), 78 pages.
McClelland, W., "Inertia Management and Dynamic Stability Analysis of a Radio-Controlled Joined-Wing Aircraft", Department of the Air Force University, (May 1, 2006), 84 pages.
Boynton R., "Measuring Mass Properties of Aircraft Control Services", 59$^{th}$ Annual Conference of the Society of Allied Weight Engineers, (Jun. 7, 2000), 78 pages.
Gracey, W., The Experimental Determination of the Moments of Inertia of Airplanes by a Simplified Compound-Pendulum Method, Jun. 1948, National Advisory Committee for Aeronautics—Technical Note No. 1629, p. 1-27.
Green, M.W., Measurements of the Moments of Inertia of Full Scale Airplanes, Sep. 1927, National Advisory Committee for Aeronautics—Technical Note No. 265, p. 1-18.
Fennell, Measurement of the Moments of Inertia of the Handley Page HP115 Aircraft, Ministry of Aviation, 1967, pp. 1-58.

* cited by examiner

METHOD AND EQUIPMENT FOR MEASURING MASS INERTIA OF MOVING SURFACES

This application is a divisional of commonly owned U.S. application Ser. No. 14/235,379, filed May 5, 2014, (now abandoned), which is the national phase application under 35 USC § 371 of PCT/BR2012/000264 filed Jul. 27, 2012 which designated the U.S. and claims benefit of BR PI1103326-6, filed Jul. 27, 2011, the entire contents of each of which are hereby incorporated by reference.

The present invention refers to an equipment for measuring mass inertia of moving surfaces, in particular primary aircraft moving surfaces, and a method for measuring the mass inertia of those moving surfaces by using that equipment and the concept of compound pendulum.

BACKGROUND OF THE INVENTION

There are many structural calculations to which aircraft parts and surfaces are submitted, and several measures and controls are applied to these parts and surfaces.

Among parts and surfaces of an aircraft which have been strictly measured and controlled we can mention primary moving surfaces, such as rudder, profounder and aileron. Such surfaces are specially submitted to measurement of the mass inertial moment, which is a geometrical magnitude of the solids measuring the movement resistance regarding its distributed mass. Thus, in case of primary moving surfaces, there is a need of assuring both control and accuracy of this measurement within acceptable tolerances in order to meet aeroelasticity requirements of those surfaces.

Equipment and methods enabling calculation or measurement of inertial moment of a solid body are known by the art, the document U.S. Pat. No. 5,309,753 being highlighted.

This document U.S. Pat. No. 5,309,753 describes an equipment and a method for determining the inertial matrix and the inertial product of a rigid body with irregular forms, such as a golf-club head. In that case, this equipment and method allow the experimental determination of mass center location and inertial moments of this type of solid bodies.

The equipment is formed by two "L" structures on which a cantilever bar is supported. The golf-club head is mounted in a cantilever bar in such a way that the golf-club cable axis is parallel with and below the cantilever bar. A cylindrical bar crosses perpendicularly the cantilever bar and a known weight is hanged in one of the ends of that cylindrical bar, preferably at the end opposed to the golf-club head. Then, the golf-club head moves towards x, y and z shafts, so as to get these coordinates for calculation of inertial moment. From those calculations and with the use of a pendulum movement of the solid body measured, products of inertia are calculated and an inertial matrix is built.

Although the equipment and method described in this document of the art allow to calculate the inertial moment of solid bodies and use the principle of compound pendulum, the equipment described herein tends to be limited for small solid bodies and would not support aircraft moving surfaces, such as rudder, elevator and aileron. The method to determine an inertial matrix of a rigid body in turn makes use of complex steps for determination of the inertial moment of the solid body used only as an intermediate stage to obtain products of inertia and inertial matrix

SUMMARY OF THE INVENTION

Thus, the present invention has for object to provide an equipment for measuring the inertial mass of aircraft moving surfaces whose geometry enables the accurate measurement of big and complex surfaces.

This invention further has for object to provide an equipment for measuring the inertial mass of aircraft moving surfaces, thus enabling different positioning of those surfaces to be measured.

Another object of the present invention is to provide a method for measuring the inertial mass of aircraft moving surfaces in a simplified, accurate and quick manner.

The invention has for object a method for measuring the inertial mass of moving surfaces, comprising the steps of:

(a) Alignment of an assembly formed by the moving surface and a support device fastened through joints in a rest position, this alignment comprising a reading in a comparing clock and driving of an adjusting element arranged in the support device aiming to obtain a predetermined value in the comparing clock;

(b) Measurement of static moment of the assembly ($M_{static}$) in an intermediate position through a dynamometer;

(c) Measurement of the oscillation period of the assembly in a pendulum position through an accelerometer arranged in the support device;

(d) Obtainment of the inertial moment of the moving surface ($I_{hhSup}$).

Another object to the present invention is an equipment for measuring the mass inertia of moving surfaces, comprising: a structure formed by a first and a second structural bodies which are concurrent, thus forming a free gap for moving surfaces positioning; the first structural body comprises at least two joints fastened to its upper part and a comparing clock arranged at its lower part; the second structural body comprising a dynamometer positioned in an extension; and a support device associated with joints and collaborating with the comparing clock and the dynamometer.

BRIEF DESCRIPTION OF DRAWINGS

The present invention will now be described in detail based on an example of performance represented in drawings. Figures show.

DETAILED DESCRIPTION OF THE INVENTION

According to a preferred embodiment and as it can be seen in FIGS. 1 to 5, the equipment 10 for measuring mass inertial of moving surfaces of the present invention comprises a rigid structure 20 formed by the first and second rigid structural bodies 21, 22 and concurrently, forming a free gap 23 for positioning of moving surfaces 50.

The first structural body 21 is formed by an upper portion 211 and a lower portion 212 parallel each other and supported by side bars 24, 24'.

At least two joints 31 and 32 are fastened to the upper portion 211 of the first structural body 21. Alternatively, other joints 31', 31", 32', 32" can be fastened to the upper portion 211 of the first structural body 21. Joints 31, 31', 31", 32, 32' and 32" are arranged aligned along the longitudinal shaft of the upper portion 211, more specifically in line and in the same height. Said joints are provided with locking pins (not illustrated) allowing, through unlocking, rotation of each joint regarding said longitudinal shaft. A comparing clock 40 is fastened to the lower portion 212 of the first structural body 21, pursuant to a preestablished alignment regarding joints 31, 31', 31", 32, 32', 32" arranged in the upper portion 211.

The second structural body 22 is also formed by upper 221 and lower 222 portions which are parallel each other and supported by side bars 24', 24". Side bar 24" comprises an extension 25 perpendicular to the second structural body 22 and over the extension 25, a dynamometer 60 is positioned.

The equipment 10 further comprises a support device 70 provided with a main bar 71, perpendicularly associated with a secondary bar 72 so as to form a "T".

The main bar 71 is rectilinear and fastened to two joints among joints 31, 31', 31", 32, 32' and 32", in such a way that the other joints (the remaining four joints) are unlocked and rotated upwards, allowing installation of the bar 71 only at two joints. The secondary bar 72, which is also rectilinear, comprises a free end 73 which is in collaboration with the comparing clock 40 and dynamometer 60, as it will be described in details afterwards. The free end 73 of the secondary bar 72 is provided with an accelerometer (not illustrated).

The moving surface 50 is associated to the support device 70, thus forming an assembly 90 (FIG. 2 to 5). Thus, main bar 71 size and that of secondary bar 72 varies in light of the size of the moving surface 50 to be measured.

Coupled to the comparing clock 40 there is an adjusting device for alignment 41 in collaboration with the free end 73 of the support device 70. Said alignment adjusting device 41 allows the alignment of the assembly 90 with the joint shafts 31, 31', 31", 32, 32', 32".

The dynamometer 60 is fastened to a movement ruler 61 arranged in the extension 25 of the second structural body 22. That movement ruler 61 moves sideways to the right and to the left over rails (not illustrated) and in light of the movements of the support device 70. In this sense, ruler 61 with the dynamometer 60 moves to the right so that the support device 70 may be lifted above the dynamometer 60 height, then the ruler 61 is moved to the left and the support device 70 is moved downwards, until being supported at the dynamometer 60 for measuring. After the measurement, rule 61 moves again to the right for repositioning the support device 70 out of dynamometer 60.

Figure 3:
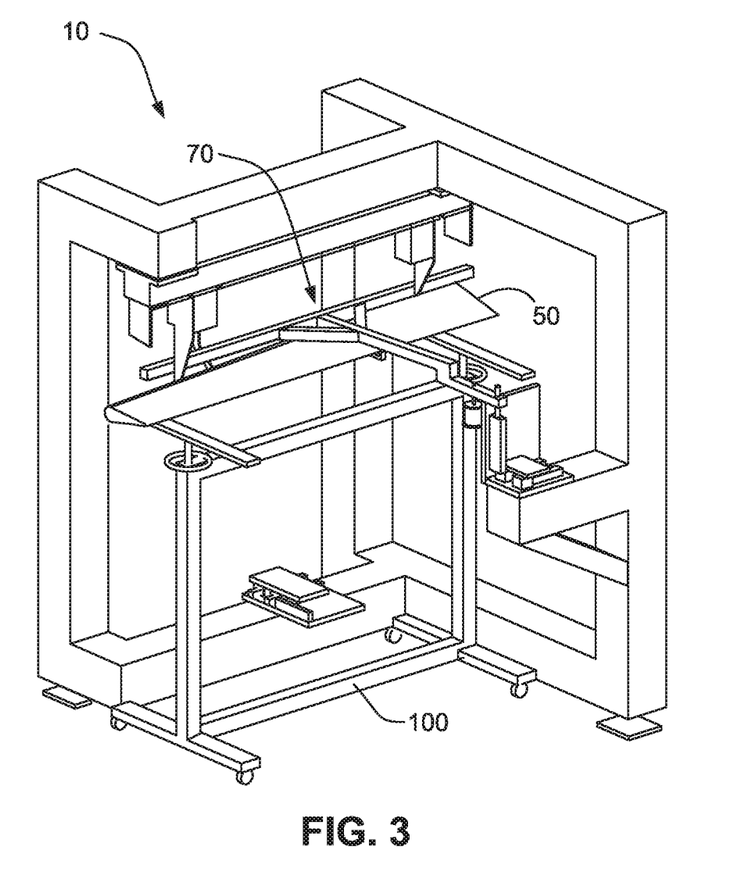
FIG. 3—is a third schematic view of the equipment for measuring the mass inertia of moving surfaces of the present invention, also comprising a moving surface coupled thereto.
Figure 4:
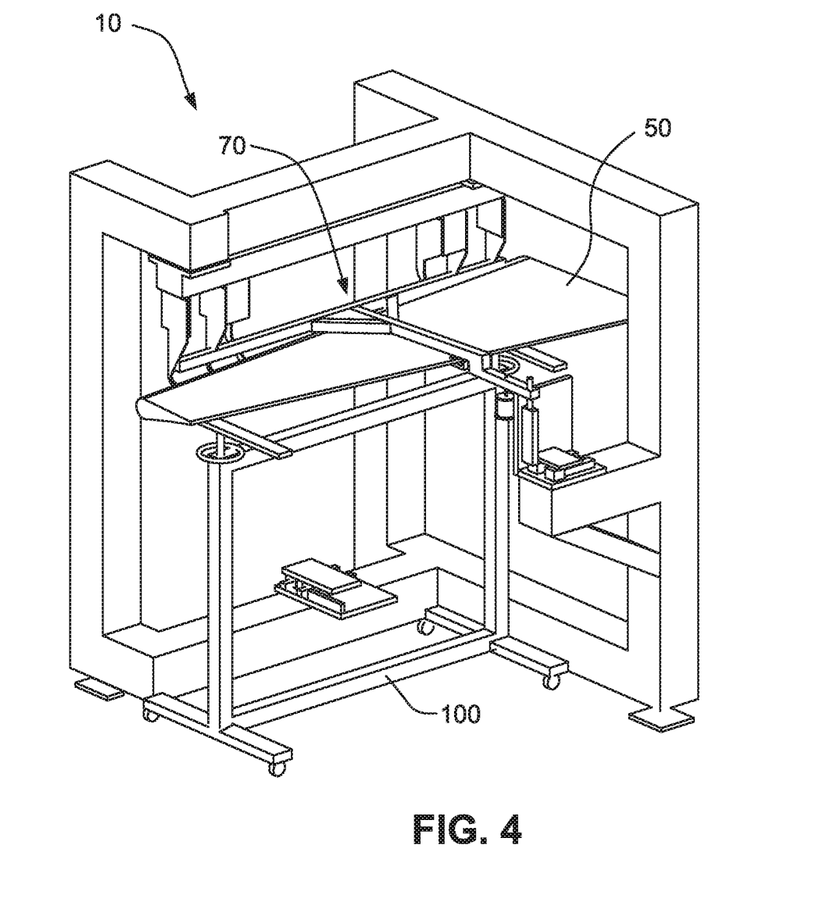
FIG. 4—is a fourth schematic view of the equipment for measuring the mass inertia of moving surfaces of the present invention, comprising a moving surface coupled thereto, unlike the surface illustrated in FIG. 3.
Figure 5:
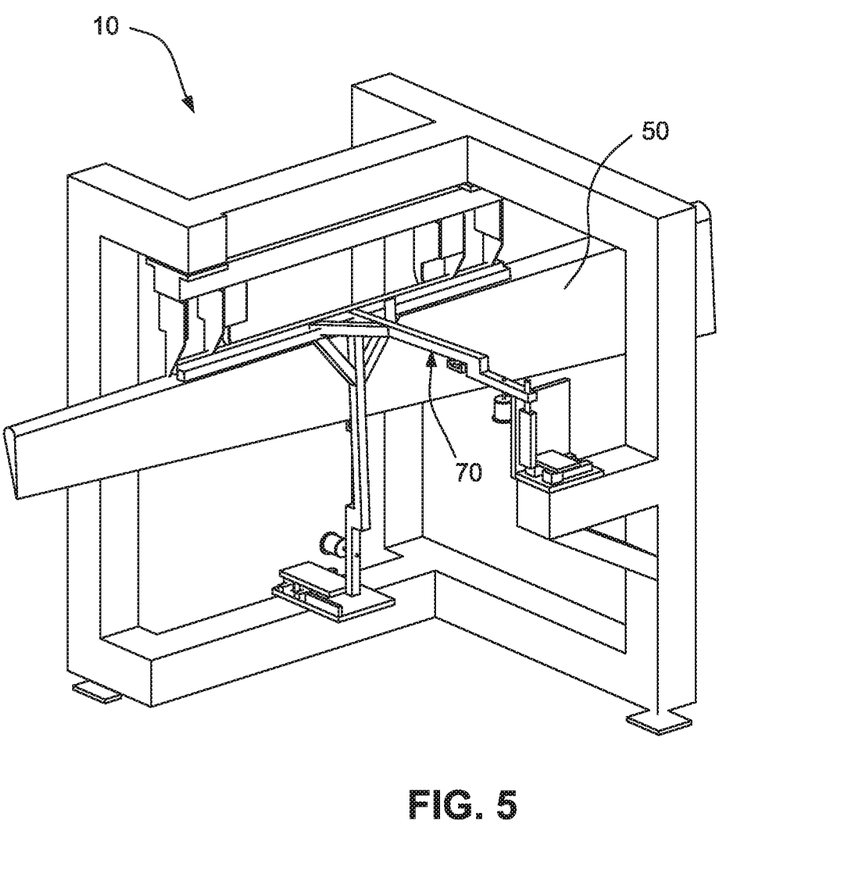
FIG. 5—is a fifth schematic view of the equipment for measuring mass inertia of moving surfaces of this invention, comprising a moving surface coupled thereto, whose surface is different from the surfaces illustrated in FIGS. 3 and 4.

As illustrated in FIGS. 3, 4 and 5, the equipment 10 allows inertia measurement of different moving surfaces 50. For certain types of moving surfaces 50, it is necessary to use a transporting car 100 for the correct positioning of the moving surface 50 next to the support device 70. As the moving surface 50 is fastened to device 70, the transporting car 100 can be removed from the gap 23 of the equipment 10 (FIG. 5).

Figure 1:
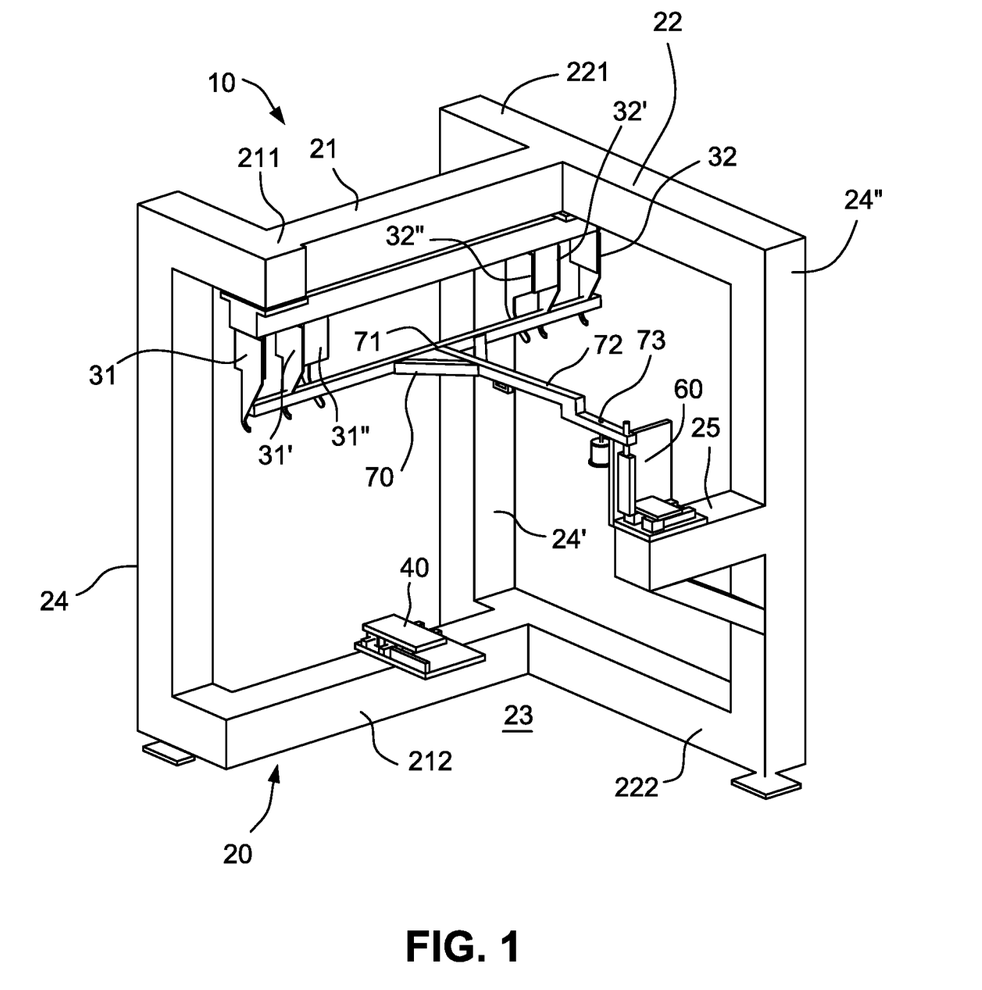
FIG. 1—is a first schematic view of the equipment for measuring inertial mass of moving surfaces of this invention, with no surfaces coupled thereto.
Figure 2:
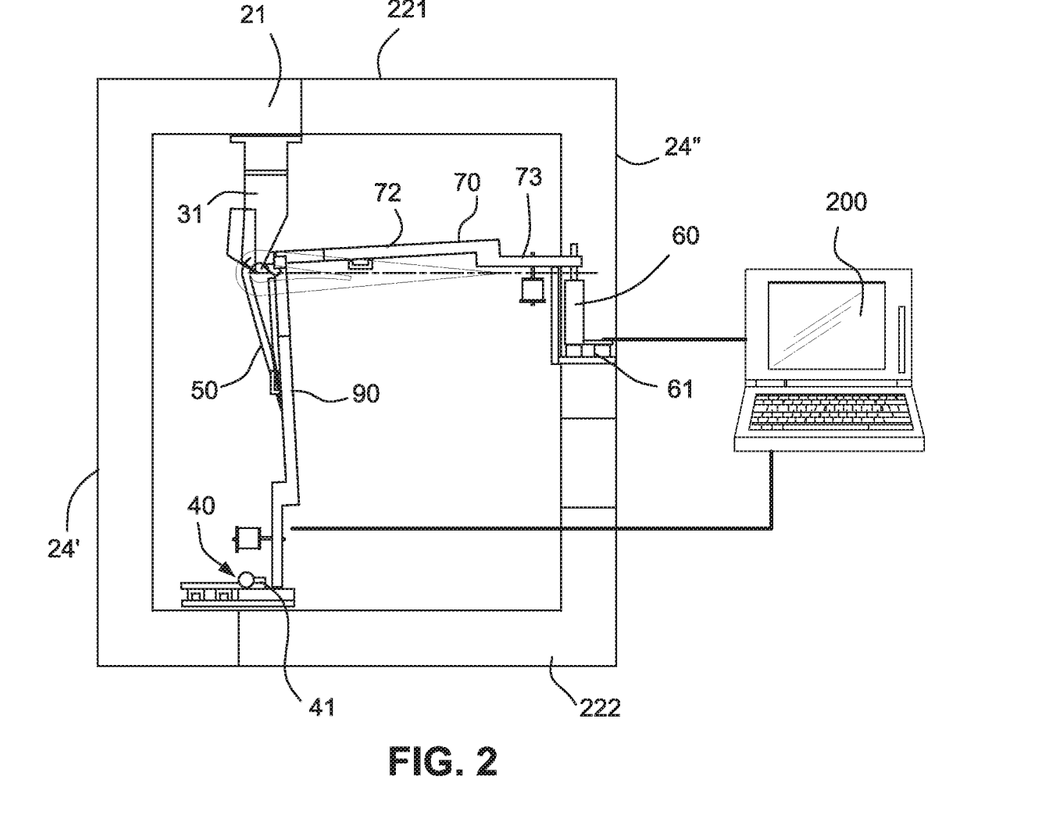
FIG. 2—is a second schematic view of the equipment for measuring of mass inertia of moving surfaces of the present invention, with a moving surface coupled thereto.

As illustrated in FIG. 2, the equipment 10 also comprises a data acquisition and processing system 200 positioned adjacent to structure 20. The data acquisition and processing system 200 consists preferably of a computer which can be associated with the equipment 10 either through cables or remotely. Other systems may also be used, provided that they meet the same function as the computer.

As previously described, the moving surface 50 to be measured is associated to support device 70, thus forming an assembly 90. This assembly 90 is supported at two joints between joints 31, 31'. 31", 32, 32', 32" in such a way that the main bar 71 of the support device 70 is fastened to the two joints and the secondary bar 72 of device 70 is released, with the free end 73 adjacent to the comparing clock 40, in the rest position (FIG. 2).

In that rest position, the free end 73 of the support device 70 is in collaboration with the comparing clock 40 so as to define the alignment of the gravity center of assembly 90. As described above, the alignment adjusting device 41, coupled with the comparing clock 40, allows the alignment of assembly 90 with joint line 31, 31', 31", 32, 32' and 32". The alignment adjusting device 41 may be a type of single-clutch device.

In order to perform the measurement, the free end 73 of the support device 70 is rotated regarding joints 31, 31', 31", 32, 32', 32". The free end 73 is taken to meet the dynamometer 60 causing the assembly 90 to become perpendicular regarding the upper portion 211 of the first structural body 21. The free end 73 is supported in the dynamometer 60 for reading and obtainment of a datum sent to the data acquisition and processing system 200.

After cooperation with the dynamometer 60 the free end 73 is positioned again in the rest position so that this free end 73 is rotated at an angle of approximately 5° and released, in order to perform a pendulum movement. Through the accelerometer arranged at the end 73, data of oscillation period of the assembly 90 is obtained and sent to the data acquisition and processing system 200.

After having received from data sent by dynamometer 60 and by accelerometer arranged at the end 73, the data acquisition and processing system 200, by means of mathematical calculation routines provides the measurement result of the moving surface 50 inertial moment associated with the support device 70.

This equipment 10 of the present invention has a geometry allowing measuring several types of aeronautic moving surfaces 50, with varied dimensions and weights, such as aileron, rudder or elevator. Moreover, this equipment 10 secures measurement accuracy, which allows meeting the most demanding project requirements.

Another advantage of this equipment 10 is the agility with which the inertial measurement is carried out, thus contributing to an increased productivity and safety in accomplishment of project stages.

Also, cost is a differential of this equipment 10 as it is composed by simple and commercially-available components, and its rigid construction is widely simplified, requiring low maintenance.

Figure 6:
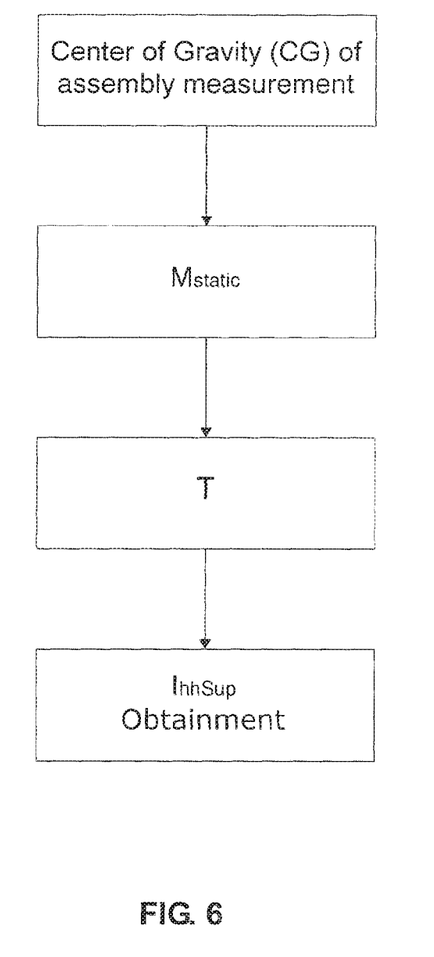
FIG. 6—is a block diagram of the method for measuring mass inertia of moving surfaces of the present invention.

As it can be seen in FIG. 6, the present invention refers to a method for measuring mass inertia of moving surfaces 50.

This method begins with alignment of CG—Center of Gravity—of assembly 90 regarding joints 31, 31', 31", 32, 32', 32". For this, the moving surface 50 to be measured is installed in the support device 70 forming the assembly 90, which is fastened to two joints between joints 31, 31', 31", 32, 32', 32" in a rest position.

In rest position, the free end 73 of the support device 70 is adjacent to the comparing clock 40, as illustrated in FIG. 2. In that position, the free end 73 contacts the comparing clock 40, thus obtaining a reading at the comparing clock 40. If the reading does not correspond to the predetermined value zero, which means that the assembly 90 is aligned, a compensation mass is installed in the supporting device 70, and a fine adjustment by screwing an adjusting pin (not shown), arranged at the free end 73, is carried out. Said compensation and fine adjustment are performed until the reading in the comparing clock reaches zero.

Once the assembly 90 is aligned, the same rotates up to an intermediate position, in such a way that the free end 73 of the support device 70 is 90° regarding the rest position and regarding joints 31, 31', 31", 32, 32', 32". In that position, the free end 73 is supported in the dynamometer 60, by performing the measurement of the static moment $M_{static}$. The datum of static moment of assembly $M_{static}$ is collected and stored by the data acquisition and processing system 200.

After measuring the static moment of assembly $M_{static}$, assembly 90 returns to the rest position, when it is rotated again in a range from 1° to 5° regarding the rest position and released, preferably 5°, thus enabling a free oscillation. By means of free oscillation of assembly 90, the period of oscillation of T assembly is measured by the accelerometer, which sends these data to the data acquisition and processing system 200, where it is stored.

The compound pendulum methodology used in the method of the present invention is based on the measurement of the surface inertial moment around the joint shaft, and that of the surface oscillation period. Thus, through equation I below, the mass inertial moment regarding the joint shaft is obtained, in this case to the shaft of joints 31, 31', 31", 32, 32', 32":

$$I_{hh} = \frac{T^2 \cdot M_{static} \cdot g}{4 \cdot \pi^2} \quad (I)$$

Where:
$I_{hh}$=mass inertial moment;
T=pendulum oscillation period;
$M_{static}$=static moment regarding joint shaft; and
g=acceleration of gravity.

Thus, from the reading of the static moment of assembly $M_{static}$ and the oscillation period T, with equation I above, the inertial moment of assembly $I_{hhSup+Disp}$ is obtained.

The obtainment of inertial moment of a moving surface $I_{hhSup}$ occurs by subtracting, from the inertial moment of assembly $I_{hhSup+Disp}$, the inertial moment of support device $I_{hhDisp}$. For that purpose, prior to performing the first stage of this method, the inertial moment of support device $I_{hhDisp}$ is measured separately, by submitting only the support device 70 to steps of this method as described above. The inertial moment of support device $I_{hhDisp}$ is stored by the data acquisition and processing system 200 in such a way that the inertial moment of the moving surface ($I_{hhSup}$) is calculated by data acquisition and processing system 200 from equation (II):

$$I_{hhSup} = I_{hhSup+Disp} - I_{hhDisp} \quad (II)$$

Where:
$I_{hhSup}$=is the mass inertial moment of the relevant moving surface;
$I_{hhSup+Disp}$=is the mass inertial moment of assembly 90; and
$I_{hhDisp}$=is the mass inertial moment of the support device 70.

After describing an example of preferred embodiment, it should be understood that the scope of the present invention covers other possible variations, it being limited only by the contents of the attached claims, the possible equivalents being included therein.

What is claimed is:

1. A device for measuring an inertial moment of a moving surface comprising:
   a support frame;
   an assembly comprised of a T-shaped support device for supporting the moving surface to be measured for inertial mass, the support device having a main bar and a secondary bar perpendicularly extending from the main bar and terminating in a free end thereof;
   a pivot joint assembly comprising pivot joints and which pivotally mounts the main bar of the support device to the support frame along a pivot axis to allow the assembly to be pivotally movable about the pivot axis between a rest position wherein the secondary bar is suspended from the support frame substantially vertically downwardly relative to the main bar and an intermediate position wherein the secondary bar extends substantially horizontally laterally relative to the main bar;
   an accelerometer operatively associated with the support device to allow measurement of an oscillation period (T) from pendular oscillations of the assembly about the pivot axis;
   a distance alignment device, and
   a dynamometer operably connectable to the free end of the secondary bar when the assembly is in the intermediate position thereof, wherein
   the free end of the secondary bar is positionable to be in operative relationship with the distance alignment device when the assembly is in the rest position thereof so that the distance alignment device is operable to provide a zeroed center of gravity (CG) reading indicative of the assembly being aligned relative to the pivot joints; and wherein
   pivotal movement of the assembly from the rest position into the intermediate position thereof so that the free end of the secondary bar is operatively connected to the dynamometer when the assembly is in the intermediate position thereof allows the dynamometer to obtain a static moment ($M_{static}$) of the assembly from the dynamometer when the assembly is in the intermediate position thereof, and wherein
   induced pendular oscillations of the assembly about the pivot joints relative to the rest position thereof allows measurement of the oscillation period (T) from the pendular oscillations of the assembly from the accelerometer operatively associated with the support device from which an inertial moment ($I_{hhSup}$) of the moving surface based on the obtained measurements for the static moment ($M_{static}$) and oscillation period (T) of the assembly can be calculated.

2. The device according to claim 1, which further comprises the moving surface attached to the support device, wherein an inertial moment of the support device ($I_{hhDisp}$) is obtained in the absence of the moving surface using the support device without the moving surface attached thereto, and thereafter attaching the moving surface to the support device to form the assembly so as to allow the inertial moment ($I_{hhSup}$) of the moving surface to be calculated based on the obtained measurements for the static moment ($M_{static}$) and oscillation period (T) of the assembly.

3. The device method according to claim 2, which further comprises a data acquisition and processing system.

4. The device according to claim 3, wherein the inertial moment ($I_{hhSup}$) of the moving surface is calculated by the data acquisition and processing system from equation (II):

$$I_{hhSup} = I_{hhSup+Disp} - I_{hhDisp} \quad (II)$$

wherein, $I_{hhSup}$ is the mass inertial moment of the moving surface;
$I_{hhSup+Disp}$ is a mass inertial moment of the assembly; and
$I_{hhDisp}$ is a mass inertial moment of the support device.

5. The method according to claim 1, wherein the intermediate position is substantially 90° relative to the rest position.

6. The method according to claim 1, which further comprises a laterally movable movement ruler in operative association with the dynamometer, wherein the movement ruler is moveable into engagement with the free end of the secondary bar when the assembly is in the intermediate position thereof.

7. The device according to claim 1, wherein the assembly is capable of inducing pendular oscillations in a range of 1° to 5° relative to the rest position of the assembly.

8. A device for measuring mass inertia of moving surfaces comprising:
   a support frame formed by first and second structural frame members which form a space for positioning of a moving surface to be measured for mass inertia;
   a pivot joint assembly supported by an upper portion of the first structural frame member;
   a distance alignment device arranged at a lower portion of the support frame;
   the second structural frame member including an extension and a dynamometer supported operatively by the extension,
   the first structural frame member including a comparator clock at a lower portion thereof; and
   a support device operatively connected to the pivot joint assembly so as to be pivotally movable about a pivot axis relative to the support frame between first and second positions such that the support device is in operative cooperation with the distance alignment device when in the first position thereof and with the dynamometer when in the second position thereof.

9. The device according to claim 8, wherein support device is T-shaped and includes a main bar pivotally connected to the pivot assembly and a secondary bar perpendicularly extending from the main bar and terminating in a free end thereof.

10. The device according to claim 9, wherein the free end of the secondary bar comprises an accelerometer.

11. The device according to claim 10, wherein the moving surface to be measured for mass inertia is supported by the support device.

12. The device according to claim 11, further comprising an adjusting device operatively associated with the support device to allow adjustable alignment between the support device and the pivot joint assembly.

\* \* \* \* \*